United States Patent
Frederick

(10) Patent No.: US 12,314,806 B2
(45) Date of Patent: May 27, 2025

(54) SUPPRESSION RFID READERS FOR TARGETING ZONE CONTROL

(71) Applicant: CLAIRVOYANT TECHNOLOGY, INC., Durham, NC (US)

(72) Inventor: Thomas J. Frederick, Chapel Hill, NC (US)

(73) Assignee: Clairvoyant Technology, Inc., Durham, NC (US)

( * ) Notice: Subject to any disclaimer, the term of this patent is extended or adjusted under 35 U.S.C. 154(b) by 0 days.

(21) Appl. No.: 18/289,193

(22) PCT Filed: Apr. 20, 2022

(86) PCT No.: PCT/US2022/025568
§ 371 (c)(1),
(2) Date: Nov. 1, 2023

(87) PCT Pub. No.: WO2022/235432
PCT Pub. Date: Nov. 10, 2022

(65) Prior Publication Data
US 2024/0220750 A1     Jul. 4, 2024

Related U.S. Application Data

(60) Provisional application No. 63/183,780, filed on May 4, 2021.

(51) Int. Cl.
*G06K 7/10*     (2006.01)
(52) U.S. Cl.
CPC .............................. *G06K 7/10475* (2013.01)

(58) Field of Classification Search
CPC .................................................. G06K 7/10475
USPC .............................................................. 235/385
See application file for complete search history.

(56) References Cited

U.S. PATENT DOCUMENTS

| | | | |
|---|---|---|---|
| 10,140,486 B1 | 11/2018 | Lavery et al. | |
| 2007/0024424 A1* | 2/2007 | Powell | G06K 7/10019 340/572.1 |
| 2010/0026493 A1* | 2/2010 | Rinkes | G06Q 10/087 340/572.1 |
| 2014/0001258 A1* | 1/2014 | Chan | G07G 1/0081 235/385 |
| 2014/0015546 A1 | 1/2014 | Frederick | |

(Continued)

OTHER PUBLICATIONS

PCT/US2022/025568, "International Search Report and Written Opinion", Jul. 15, 2022, 14 pages.

*Primary Examiner* — Michael G Lee
*Assistant Examiner* — David Tardif
(74) *Attorney, Agent, or Firm* — Kilpatrick Townsend & Stockton LLP

(57) ABSTRACT

Certain aspects and features of the present disclosure relate to a system that improves the localization and interrogation of RFID tags in an environment with many tags. Suppression antennas are used to create suppression zones around large background tag populations around or near the portal. The suppression antennas quiet the tags in a suppression zone to prevent erroneous tracking of these tags at nearby RFID portal antennas. Optionally, a suppression RFID reader can communicate with neighboring readers, including a portal RFID reader, to provide information that can be used for expedited tracking of a tag that may be approaching an RFID portal.

22 Claims, 5 Drawing Sheets

(56) References Cited

U.S. PATENT DOCUMENTS

| | | | |
|---|---|---|---|
| 2015/0015375 A1* | 1/2015 | Smith | G06K 19/0723 340/10.32 |
| 2016/0055566 A1 | 2/2016 | Otani et al. | |
| 2020/0320257 A1 | 10/2020 | Volpi et al. | |
| 2023/0419057 A1* | 12/2023 | McMillan | G06K 7/10366 |

* cited by examiner

SUPPRESSION RFID READERS FOR TARGETING ZONE CONTROL

CROSS-REFERENCE TO RELATED APPLICATION

This application claims priority to U.S. Provisional Patent Application 63/183,780, filed May 4, 2021, the entire disclosure of which is incorporated herein by reference.

TECHNICAL FIELD

The present disclosure relates generally to radio frequency identification (RFID) systems. More particularly, though not exclusively, the present disclosure relates to systems that detect specific backscatter RFID tags in an environment where many RFID tags are present.

BACKGROUND

RFID systems include, at least, an RFID reader and an antenna. The antenna is used by the reader to transmit interrogation signals to RFID tags and receive responses from the RFID tags. RFID systems can use multiple antennas to establish various interrogation zones in which tags can be detected. In many applications it is useful to determine if and when a particular RFID tag passes through a portal or moves from one interrogation zone to another, such as in retail loss prevention, race timing, document tracking, conveyor systems, etc. Localizing a tag in an environment with many tags in the system can be challenging due to low tag read rates, even with multiple antennas or specialized antennas.

SUMMARY

Aspects and features of this disclosure include a method of tracking targeted tags from a population of RFID tags using a portal antenna. The population of RFID tags includes both the targeted tags and at least one background tag. The method further includes transmitting, using a suppression antenna, a de-targeting command. The de-targeting command is configured to deselect background tags. When a background tag is proximate to the suppression antenna, the background tag is de-selected in order to prevent the background tag from being erroneously tracked using the portal antenna. The method additionally includes singulating, using the suppression antenna, the background tags to access an identity of each de-targeted background tag as a quieted tag, and store the identity of the quieted tag in a suppression database. Aspects and features of this disclosure also include a non-transitory storage medium with instructions to perform the operations of a method such as just described as well as RFID readers and systems of RFID readers and antennas to perform the operations of a method such as just described.

In some examples, aspects and features can include detecting, using the suppression database, a new RFID tag proximate to the suppression antenna and storing information describing the new RFID tag in the suppression database. This information is configured to provide expedited targeting of the new RFID tag when proximate to the portal antenna. While some targeted RFID tags are configured for targeting based on read measurements stored in a targeting database, the new RFID tag is configured for expedited targeting based on its subsequent detection at the portal antenna. Information about the new RFID tag can be stored in the in the suppression database, and copied into a shadow database accessible for detecting and targeting new tags at or near the portal. In some examples, the suppression database is stored in a suppression RFID reader and the shadow database is stored in a portal RFID reader, wherein the RFID readers communicate over a network.

DETAILED DESCRIPTION

Figure 1:
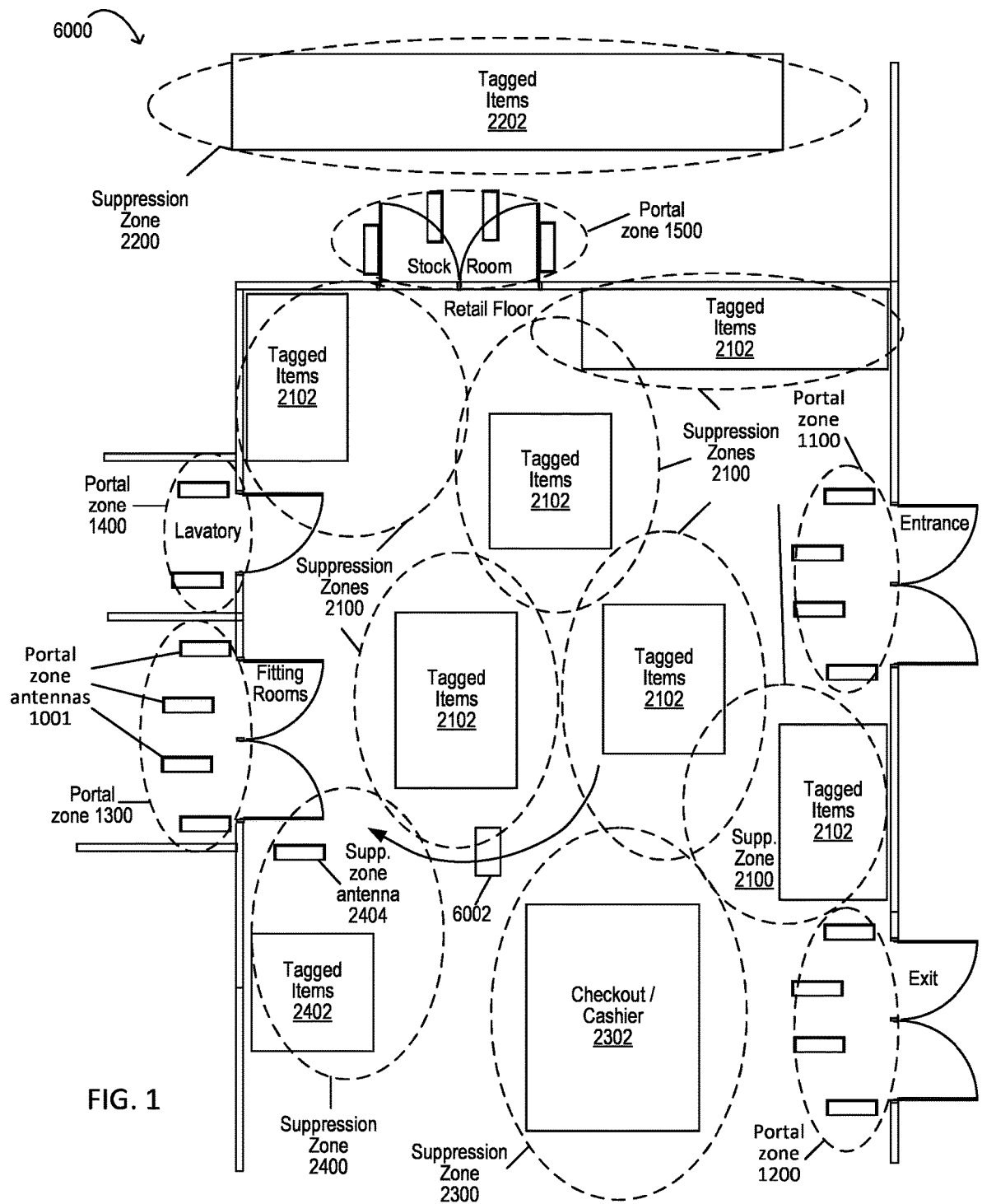
FIG. 1 is a floorplan showing of an operating environment for an RFID system with tagged items in suppression zones according to certain aspects of this disclosure.

Certain aspects and features of the present disclosure relate to a system that improves, and makes more efficient, the localization and interrogation of RFID tags in an environment with many tags. Certain aspects and features of the present disclosure improve portal zone detection reliability by using suppression antennas to create suppression zones around large background tag populations around or near the portal. The suppression antennas quiet the tags in a suppression zone to prevent erroneous tracking of these tags at a nearby portal antenna. Optionally a suppression RFID reader can communicate with neighboring readers, including a portal RFID reader, to provide information that can be used for expedited or prioritized tracking of a tag that may be approaching a portal. Terms such as "quieted," "quiet," or the like when used herein in reference an RFID tag mean that the tag is automatically configured by setting appropriate data flags so that a portal RFID reader will not treat the tag as a priority for detection and/or tracking, for example, by using enhanced read rates, special antenna configurations, special frequencies, or other prioritization techniques.

Many RFID applications are intended to detect that a tagged object moves into or through an interrogation zone, also referred to herein as a portal. For example, such applications are used in loss prevention systems such as at the entry/exit of retail stores, in baggage handling areas, at distribution center dock doors, and so on. The problem of detecting tags with high reliability when a tagged object moves into the portal while reliably rejecting tagged objects, which are outside the portal, can be especially difficult to deal with in environments with many tags. Due to multipath effects in UHF and microwave RFID systems, it is not typically possible to control or prevent the reading of stray or background tags, which are not in the portal. These background tags need to be rejected reliably, i.e., the system should have a low probability of false alarm on background tags not in the interrogation zone, while maintaining a high probability of detection for tags that move into the portal.

In accordance with examples in this disclosure, in order to reduce false alarms, background tags are quieted by a suppression antenna broadcasting, at regular intervals, a command that sets a select (SL) flag of a tag so that that the tag will not be targeted by a portal reader until the select flag is deliberately set due to some other event, such as one that indicates the tag is in motion. These quieted tags are then inventoried by the suppression reader and information about the quieted tags currently in the suppression zone is stored in a suppression database. This process repeats at regular intervals. Optionally, the suppression database can be used to identify new tags in a suppression zone, which can be expeditiously treated as potential targets if one of these new tags is spotted at another reader, such as the portal reader.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Backscatter RFID uses a far field, propagating wireless air interface, typically using UHF, microwave, or high frequencies. Because of propagation effects, the air interface between RFID readers and tags is subject to multipath interference. Multipath interference can be destructive, resulting in small scale fades. Multipath interference can also cause constructive interference resulting in local hot spots well away from the intended portal zone. This problem of RFID antenna hot spots outside of the intended read zone is known as overrange. In this application, where portal RFID readers are determining with high probability whether a tag is moving through the zone, the most detrimental effect is overrange due to constructive interference. When the overrange problem occurs in a portal zone, it can lead to the spuriously read tag as being erroneously detected as passing through the portal zone, causing a false alarm.

In some RFID applications, the portal zones must be placed very close to large populations of tags just outside of the portal zone. The large populations of tags outside the portal zone are known as stray tags or background tags. There may be shelves or racks of stray tags in warehouses, distribution centers, or retail sales floors, to name just a few types of sites for RFID applications. For example, in a retail sales floor, the floor space can be expensive on a per square foot basis, and retailers typically try to occupy floor space as densely as possible with retail inventory. Racks, tables, or shelves of background tags on inventory could be very close to the portal zone, often within one meter for retail loss prevention applications. FIG. 1 is a floorplan showing such an operating environment 6000.

FIG. 1 schematically illustrates a dense sales floor. FIG. 1 shows five separate portal zones. Portal zone 1100 is at the entrance, portal zone 1200 is at the exit, portal zone 1300 is at the fitting room door, portal zone 1400 is at the lavatory door, and portal zone 1500 at the stock room door. Portal zone antennas 1001 are referenced at the fitting room doors, however the same structures can be seen in the other portal zones but for clarity are not referenced in the drawing. FIG. 1 also shows, according to features and aspects of this disclosure, numerous suppression zones 2100 over retail display areas with tagged items 2102, as well as a suppression zone 2200 over a stock room inventory of tagged items 2202, and suppression zone 2300 over the checkout/cashier area 2302. Any or all of these areas may contain many tagged items, which may be spuriously read by the portal zone RFID antennas 1001. Note that the zones shown in FIG. 1 are idealized patterns for convenience of illustration. Multipath propagation effects can create a much more complex field patterns.

FIG. 1 also shows, as an example, tag 6002, which is in motion through the facility. Tag 6002 appears to be crossing into suppression zone 2400. This arrival in suppression zone 2400 can be detected using suppression zone antenna 2404 and optionally trigger a suppression arrival event to be noted and possibly acted on in other zones, as will be discussed further below. For example, if separate portal and suppression RFID readers are being used, information regarding this tag 6002 can be sent from the suppression reader for suppression zone 2400 to the portal reader(s) for one or more of portal zones 1300 and 1400.

For the purposes of the examples herein, a portal zone is a transition zone, wherein it is advantageous to know with high confidence that a tag has or has not passed through the zone. An example is a retail store entrance or exit, where it is important to the business operation that tagged items not purchased should remain within the store. For the purposes of the examples herein, a suppression zone is an area with possibly many tagged items, which may be near the portal zone. A suppression zone can be any retail display area with tagged merchandise.

Figure 2:
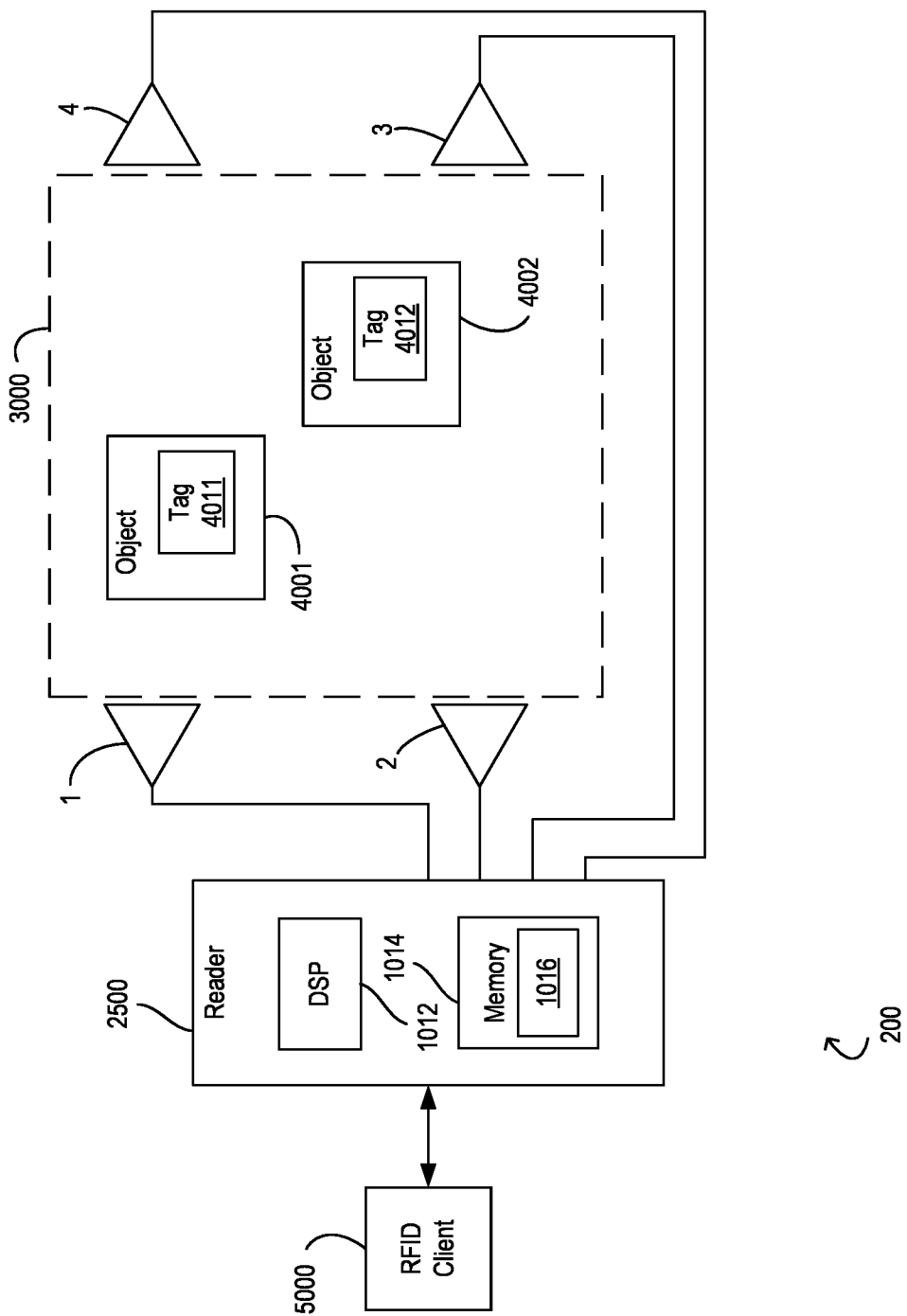
FIG. 2 is a block diagram of an operating environment for an RFID system with tagged objects that can be either in a portal zone or be present in suppression zone.

FIG. 2 shows a block diagram of the operating environment 200 with, as an example, RFID reader 2500 used for reading RFID tags on tagged objects such as object 4001 and object 4002 in and near a zone 3000. The zone may be a portal zone or a suppression zone. Two objects are shown as an example in FIG. 2, although the actual number of objects varies. The reader 2500 is attached to one or more antennas, where FIG. 1 shows four antennas as an example: antenna 1, antenna 2, antenna 3, and antenna 4. These antennas are typically connected to the reader using coaxial cable, although the antennas could be connected using waveguides, microstrip, stripline, or some other technique. This example includes four antennas, but any number of antennas may be used. The tagged object 4001 has RFID tag 4011 attached and the tagged object 4002 has RFID tag 4012 attached. Typically, there is one tag attached to each object, although in some applications there could be more than one tag attached to some items, such as when the item may be challenging to read from all angles. The RFID reader 2500 may be connected to RFID client 5000, which uses the RFID information for some application purpose. In some examples, wherein zone 3000 is a portal zone, the RFID client 5000 may execute some portion of an RFID tag targeting algorithm(s). This division of the computational load may be used, for example, when the reader 2500 is computationally constrained and simply passes the observable information to client 5000, which includes more computational capability.

In order to implement the functions of the RFID reader 2500, a general-purpose processor such as DSP 1012, a microcontroller, an embedded controller, or a microprocessor can be used and firmware, software, or microcode can be stored in a tangible or non-transitory computer-readable storage medium that is associated with a processor, such as memory 1014. Such a storage medium may be a memory integrated into the processor, or may be a memory chip that is addressed by the processor to perform control functions. Such firmware, software or microcode includes instructions 1016 executable by the processor and when executed, cause the processor to perform its targeting and monitoring functions. Such firmware or software can also be stored in or on a tangible medium such as an optical disk or traditional removable or fixed magnetic medium such as a disk drive used to load the firmware or software into an RFID reader.

All the tags in the environment, including tag 4011 and tag 4012, use the RF carrier signal from the reader 2500 as the medium to communicate back to the reader via backscatter modulation. The tags modulate their radar cross section to vary the amount of the reader's RF carrier, which is reflected to the reader. This backscatter modulated RF signal may be received by one or more of the reader's antennas and passed into the RFID reader 2500 for processing. Note that although the examples described herein are focused on ultra-high frequency (UHF) band RFID, the methods and apparatus described herein can readily be applied to readers operating in the 2.45 GHz microwave band, or other RFID readers, and to various protocols used in the UHF or microwave bands. Note also that reader 2500 may be a suppression reader in that it is only connected to suppression antennas and only executes suppression functions, it may be a portal reader connected to only portal antennas for executing portal targeting functions, or one reader may implement both suppression and portal targeting functions and be connected to multiple antennas, some being portal antennas and some being suppression antennas. Also, antennas may be deployed in various orientations. For example, portal antennas can be deployed beside a portal zone, while suppression antennas may reside over suppression zones, in or on a ceiling.

A portal zone reader and portal zone antennas can implement an algorithm to target RFID tags if information gathered about the tags suggests that the tags may be moving through or near a portal zone. As an example, after initialization and initial interrogation is complete, the air interface module of a portal reader can read background tags at a relatively slow rate and gather information such as read measurements and store this information in a targeting database. The portal reader can then target a tag for observation at an enhanced read rate based on changes in read measurements. Read measurements, as an example, may include carrier phase measurements and backscattered signal strength, which can be used to derive movement and/or relative position. The reader may read tags in accordance with a specification such as ROspec, a publicly available, low level reader protocol standard. ROspec is short for "Reader Operation Specification." An ROspec defines the basic air interface functionality while this ROspec is running. Referring to the RAIN RFID specification regarding sessions, ROspec uses session 1 singulation from the A to B state. This concept of "session 1 singulation from the A to B state" is discussed below.

RAIN RFID tags have four binary session flags, each of which can be in one of two states referred to as A or B. The session flag used to for a tag read is set by the RFID reader. Only one session flag can be used at a time. A is the default state for all the session flags after a prolonged period of no power. Session flags have a defined persistence property, which is the time value for how long an RFID tag will maintain the session flag state in the B state, without RF power.

The session flags can allow multiple readers in proximity to perform inventory operations in different sessions, possibly reducing interference between the readers. Individual tags can only participate in an inventory operation in a single session at a time. For example, if a particular tag is participating in an inventory operation in session 0, that tag will ignore incremental inventory commands from readers operating in different sessions. This arrangement can help reduce logical crosstalk between adjacent readers and the tag population they are trying to inventory.

The different persistence values of the four session flags are intended to aid in inventory accuracy in various applications. For example, in environments with low tag populations and potentially fast-moving tags, session 0 can be used because passive tags are ensured to become powered on in the A state for session 0. Inventory operations focus on tags with a specified session (0, 1, 2, or 3) and that session's state, A or B. As the reader inventories tags, those tags' session flags get toggled from their current state to the opposite state, i.e., A to B, or B to A. If the reader removes RF power, all the tag's session 0 flags return to state A.

In some applications it can be useful for a session flag to maintain the B state even when there are brief interruptions in RF power, such as when the reader needs to switch antennas or carrier frequencies. Sessions 1, 2, and 3 all exhibit the property of a finite persistence while the tag is de-energized. Sessions 2 and 3 maintain the B state at least 2 seconds without power. This persistence can be useful when inventorying large tag populations since inventoried tags will remain in the B state and can remain quiet while the reader inventories the remaining tags, changing the states from A to B.

Session 1 behavior is different from the others in that the session 1 flag B state expires after a specified period whether or not RF power is being applied. The session 1 flag will change from B to A after from 500 milliseconds to 5 seconds. Thus, the session 1 state persistence is bounded. Typical RAIN tag designs provide for the session 1 flag to have persistence of approximately 1 second at room temperature. A tag targeting process can use the bounded persistence property of session 1 to monitor a background tag population reliably, by reading the tags whose session 1 flag is in the A state.

The RFID tags also have a select flag, sometimes also referred to as an "SL" flag. The select flag is a binary flag considered to be "true" (selected) or "false" (not selected). The select flag has the same persistence as the session 2 and session 3 flags. The select flag can be set to true or false using a select command. The select flag in a targeting process can be used to configure a tag as a targeted tag for an enhanced read rate. In an environment with high tag populations and high tag density, such as those discussed with respect to FIG. 1, there is a greater likelihood than in other environments of the select flag being erroneously set for portal targeting, and of a legitimately set flag becoming stuck when the tagged item is moved away from the portal and left elsewhere in the premises or returned to its display or shelf. Either of these conditions can result in extra bandwidth for portal readers being consumed and performance being reduced, increasing the likelihood of both missed tags and false alarms, since throughput can become saturated.

The examples of this disclosure improve portal zone detection reliability by using suppression antennas at or near zones of large numbers of background tags around or near the portal zone. These suppression RFID antennas provide at least three benefits. Firstly, the suppression antennas exploit what is known as the capture effect. When using simultaneous transmissions on both the suppression zone antennas and on the portal zone antennas, all tags will respond to whichever reader's transmit signal is much stronger, a phenomenon known as the capture effect. Portal zone antennas capture the attention of tags moving through the portal since the portal zone field is much stronger there. At the same time, background or stray tags in the suppression zone are captured by the suppression zone antennas. When tags are somewhere between the suppression zone and the portal zone, the two transmit fields will be approximately the same and the tags may not respond to either reader, which is also better than being read by the portal antennas and using up portal read throughput.

Secondly, the suppression antennas transmit de-targeting commands at essentially regular intervals so that any stray tag in the suppression zone that may have become erroneously targeted by the portal reader gets de-targeted. This de-targeting is beneficial since the portal reader may not be able to get the stray tag's SL flag to flip to the false state when targeting is no longer needed. The de-targeting command is configured to deselect a background tag proximate to the suppression antenna in order to prevent the background tag from being erroneously tracked using the portal antenna.

Thirdly, the suppression RFID reader may be configured to inventory and track background tags by storing the identity of such a tag in database as a quieted tag. The suppression RFID reader can then communicate to its neighboring RFID readers when a new tag enters its zone, since the suppression RFID reader will not have a record of this new tag. This arrival of a new tag in a suppression zone is referred to herein as a suppression arrival event. Portal zone RFID readers may be configured to listen for suppression arrival events from adjacent suppression readers. These suppression arrival events are often received before the subject tag reaches the portal zone. A suppression arrival event gives an early warning to watch for that tag and target it, since its appearance in the suppression zone gives a priori information that it is likely on the move.

Figure 3:
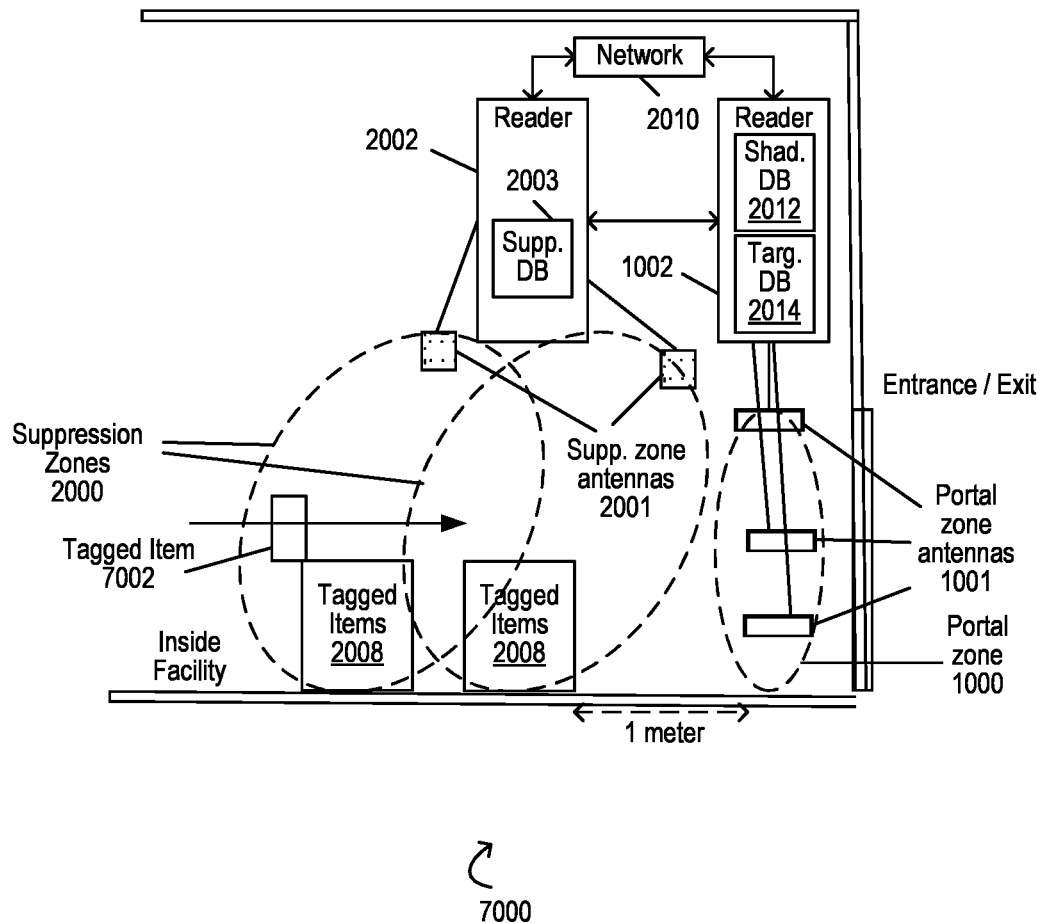
FIG. 3 is a side view of an operating environment for a system that includes a portal RFID reader and a suppression RFID reader according to certain aspects of this disclosure.

FIG. 3 shows the side of profile view 7000 of a portal zone 1000 and suppression zones 2000. The portal zone antennas 1001 are commonly on both the sides and overhead, while suppression zone antennas 2001 may be more conveniently placed above the relevant tag populations, for example, in or on a ceiling over tagged items on a counter or table below. As before, the zones are idealized for illustrative purposes. As illustrated, the suppression zone antennas cover the nearby background tags on tagged items 2008 and minimize these stray tags' responses to or interactions with the portal RFID reader 1002. This is accomplished by the capture effect, as previously discussed, as well as the regular broadcasting of the de-targeting commands into the stray tags to de-target any erroneously targeted tags within the stray population. In this example, separate suppression RFID reader 2002 makes us of the suppression antennas 2001 to accomplish these suppression functions. However, the functions of the suppression reader and the portal reader can be combined into a single RFID reader that feeds multiple antennas.

FIG. 3 shows a tagged item 7002 in motion through the suppression zones. When the tag on item 7002 arrives in the suppression zone, the suppression RFID reader 2002 may optionally have been configured to send suppression arrival events to nearby readers to provide an early warning of a tag, which may be heading toward a neighboring zone. Suppression RFID reader 2002 can determine if a tag is new because it inventories tags it has quieted and stores an identification of each quieted tag in suppression database 2003. Suppression arrival tags (new tags in neighboring suppression zones) are communicated to portal RFID reader 1002 through network 2010 and stored in the portal reader's memory, for example in a shadow database 2012. This shadow database is configured to flag suppression arrival tags to indicate that they have not been seen over the air by an antenna in the portal zone, but may be coming. If such a tag is seen over the air, it can be targeted and tracked, in which case its identity is stored in targeting database 2014 in portal reader 1002. In some examples, the readers do not communicate over network 2010, but rather by establishing point-to-point connections.

Figure 4:
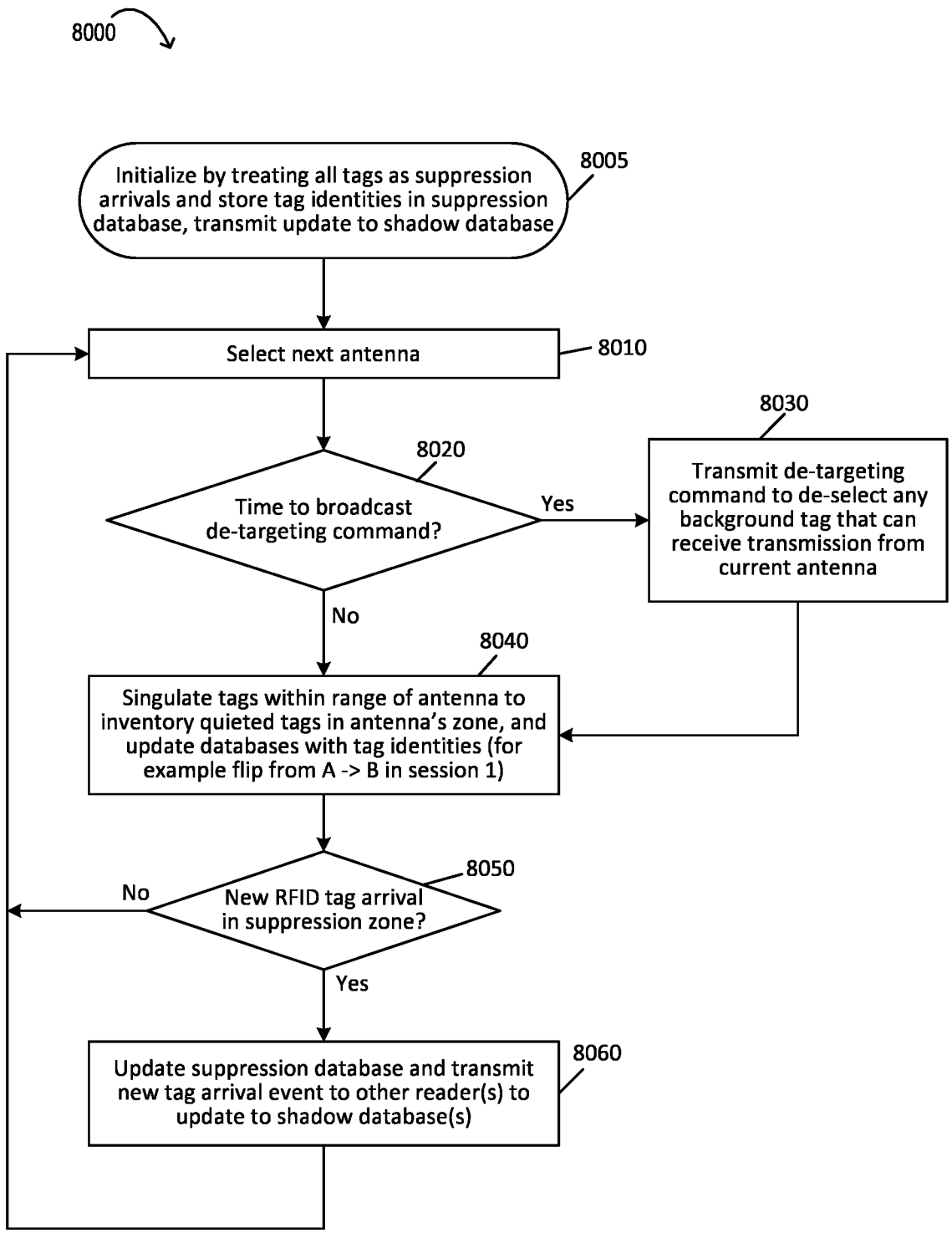
FIG. 4 is a flowchart of an example of a process for tag suppression using a suppression RFID antenna according to certain aspects of this disclosure.

FIG. 4 is a flowchart of an example of a process for background tag suppression using suppression RFID antenna according to certain aspects of this disclosure. The suppression process 8000 starts at block 8005, where the system is initialized by treating all tags as new tags with their presence being suppression arrival events to populate both suppression database 2003 and shadow database 2012. All of the tag databases in these examples have finite data hold times, such as from ten seconds to one hour, depending on the application, meaning a record is deleted or eliminated once the hold time for a record has elapsed. Longer tag database memory can be useful when there are a great number of tags. In such cases, there may be background tags near the interrogation zone that occasionally are flipped due to constructive multipath propagation at the tag as well as more suppression arrival events. Having a longer tag database memory can help the system remember and recognize such tags. Process 8000 proceeds to block 8010, wherein the radio control selects to the next antenna in the sequence of suppression antennas available. If the system has just been initialized, this will be whichever antenna the system is designed to use first. If processing has returned to block 8010 as described below, the antenna selected will be the next antenna in the sequence.

At block 8020 of process 8000, a determination is made as to whether it is time for a scheduled broadcast of the de-targeting command to the background tag population available at the selected antenna. These transmissions can be configured for once every 500 milliseconds, for example. As a further example, any scheduling from 100 milliseconds to one second can be used. The scheduling may optionally also take into account the operating frequency channel. The de-targeting schedule can be designed to occur with both a specified time interval and specified frequency interval to provide the broadcasts with frequency diversity over time. If a de-targeting time has been reached at block 8020, the de-targeting command is transmitted at block 8030. The process continues to block 8040 wherein the background tags are read and quieted. By quieted, what is meant in these examples is that the background tags are read in session 1, 2, or 3, which have persistence times per the RFID air interface communications standards. Session 1 is useful in this example, as it exhibits spontaneous refresh, typically around 1.2 seconds at room temperature.

Singulation at block 8040 allows the tags to be inventoried and their identities are stored in suppression database 2003 and transmitted to the portal reader(s) to update shadow database 2012. The functions included in blocks 8020 through 8040, all discussed with respect to FIG. 4, can be used in implementing a step for quieting a background tag in order to prevent the background tag from being erroneously tracked using the portal antenna. It should be noted that if a single RFID reader is a suppression reader and also provides the portal zone functions, there is no shadow database, as the portal RFID process can access the suppression database. In either case, the suppression database is configured for use in identifying a new RFID tag arriving in a suppression zone.

Continuing with FIG. 4, the suppression reader uses the current suppression antenna to listen for new RFID tag arrivals in the suppression zone at block 8050. If no new arrivals are detected, process 8000 continues back to block 8010 and the process repeats. If a new arrival is detected at block 8050, then the suppression reader process 8000 updates the suppression database at block 8060 and transmits a new tag arrival (suppression arrival event) to nearby readers such as portal RFID reader 1002, either over a network such as network 2010, or using point-to-point communication. Process 8000 then continues back to block 8010 and repeats from there. It should be noted that even in environments where a suppression RFID reader is a combined reader that includes the portal reader functions and antenna connections as well as the suppression reader functions and antenna connections, arrival events can be transmitted to other such readers if more than one reader is in use. Such transmissions facilitate enhanced targeting as described below with respect to FIG. 5 at all portals in the environment. In such an example, each reader maintains a suppression database and each suppression database is a shadow database for the others so that all the suppression databases are synchronized.

Figure 5:
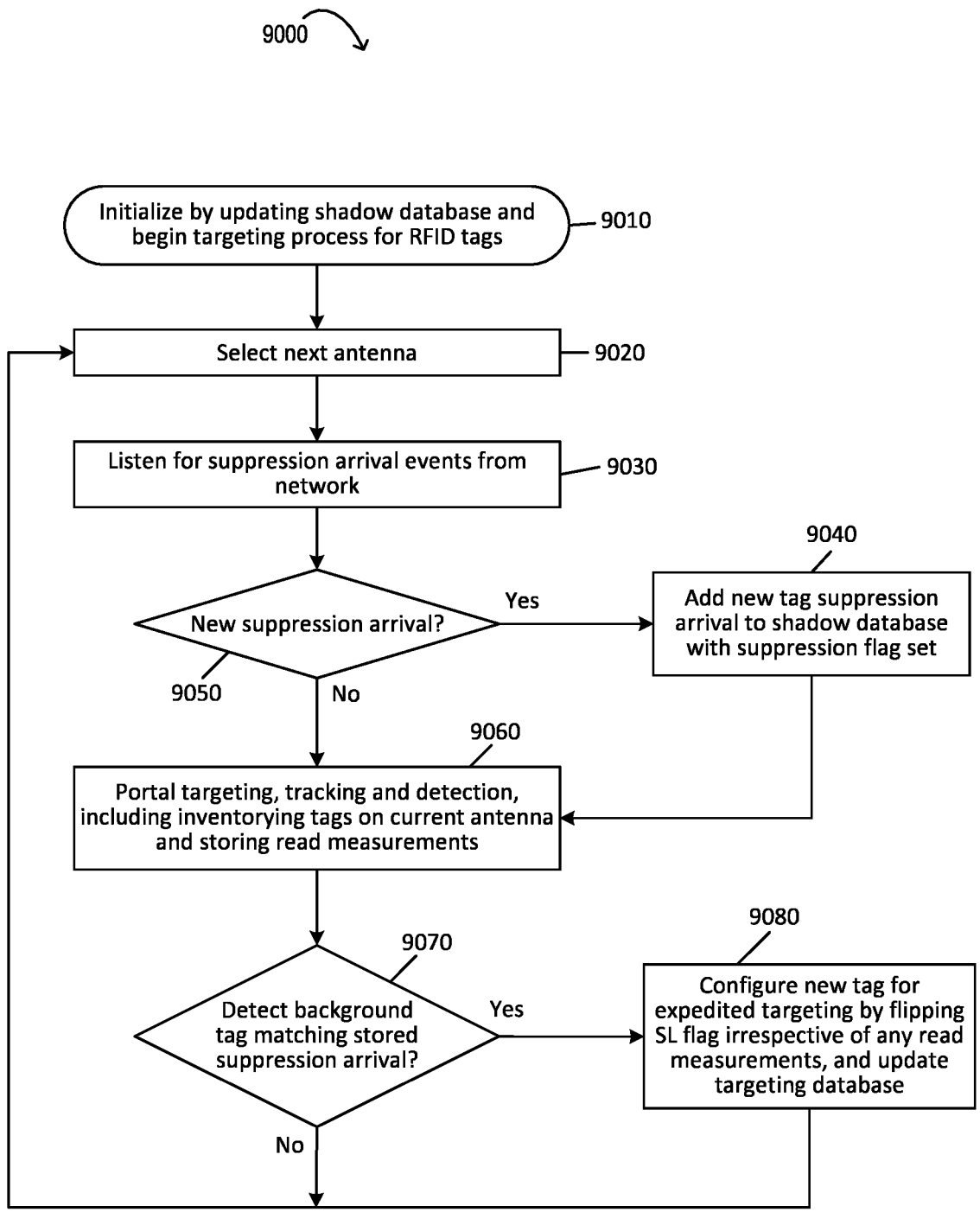
FIG. 5 is a flowchart of an example of a process for reading targeted tags using a portal RFID antenna according to aspects of this disclosure.

FIG. 5 is a flowchart of an example of a process for reading targeting tags using a portal RFID antenna according to aspects of this disclosure. The portal process 9000 begins at block 9010 when the system is initialized and databases are initially populated. For example if the suppression and portal RFID readers are separate, portal RFID reader 1002 eventually populates shadow database 2012 with information from suppression reader 2002. The read-measurement-based portal zone tag targeting process is started. At block 9020 the next antenna is selected. The selected portal antenna is used to gather information including identities and read measurements for any tags moving in or near the portal. At the same time, at block 9030, the portal process listens for suppression arrival events from neighboring suppression zones. If a suppression arrival event indicating a new tag in a nearby suppression zone is detected at block 9050, the tag's identity is stored in the shadow database and/or a suppression flag is set at block 9040 so that the portal targeting process will be aware of the origin of the new tag if it appears at the portal.

Staying with FIG. 5, the portal reader process continues to block 9060 where portal targeting takes place based on decisioning at the portal zone, including inventorying tags, storing read measurements, and flipping the SL flag to true for tags as appropriate based on read measurements or any other factors that have been programmatically set so that tags become targeted for enhanced read rates. Targeting in the normal course can be based on tag read measurement history, wherein a select command is sent to flip the SL flag of a tag to true. Stopping conditions for portal targeting can be time based, or based on some specific number of antenna rounds to process, or some other criteria.

At block 9070 of process 9000, the portal RFID antenna is used to listen for new over-the-air arrivals, which match recent suppression arrivals stored in the shadow and/or suppression databases. In a typical operating environment, a time window is set to between 5 and 10 seconds from the time a suppression arrival event occurs to the time the new tag is seen by the portal RFID antenna over the air. If the over the air arrival occurs within this time window, then the portal reader will target the tag at block 9080 based on the suppression reader event, without resorting to any other criteria, such as those used in the parallel portal-based targeting described immediately above, essentially expediting the tags targeted status relative to that parallel targeting process. The functions included in blocks 9070 through 9080, discussed with respect to FIG. 5, can be used in implementing a step for configuring the new RFID tag for expedited targeting based on its subsequent identification using the portal antenna. The expedited targeting in this example includes flipping the SL flag to true and updating the targeting database 2014. If the over the air arrival event occurs after the time window expires, then the arrival will be targeted based on normal criteria of the portal-based targeting described above. In either case, process 9000 loops back to block 9020, wherein the process repeats.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein. It will also be understood that when an element is referred to as being "connected" to another element, it can be directly connected or coupled to the other element or intervening elements may be present. Additionally, comparative or quantitative terms such as "above" and "below," and the ends of ranges of values are intended to encompass the concept of equality.

The foregoing description of the examples, including illustrated examples, has been presented only for the purpose of illustration and description and is not intended to be exhaustive or to limit the subject matter to the precise forms disclosed. Numerous modifications, combinations, adaptations, uses, and installations thereof can be apparent to those skilled in the art without departing from the scope of this disclosure. The illustrative examples described above are given to introduce the reader to the general subject matter discussed here and are not intended to limit the scope of the disclosed concepts.

What is claimed is:

1. A method comprising:
tracking, at a first read rate, targeted tags from a population of RFID tags using a portal antenna, the population of RFID tags including the targeted tags and at least one background tag;
transmitting, using a suppression antenna, a de-targeting command to set the at least one background tag, located proximate to the suppression antenna, for tracking at a second read rate, thereby preventing the at least one background tag from being tracked at the first read rate using the portal antenna;
singulating, using the suppression antenna, the at least one background tag to access an identity of the at least one background tag as a quieted tag; and
storing the identity of the quieted tag in a suppression database configured for use in identifying new RFID tags.

2. The method of claim 1, further comprising:
detecting, using the suppression database, a new RFID tag proximate to the suppression antenna; and
storing information describing the new RFID tag in the suppression database, the information configured to provide targeting of the new RFID tag at the first read rate when proximate to the portal antenna.

3. The method of claim 2, further comprising:
selectively configuring at least some of the targeted tags for targeting based on read measurements stored in a targeting database; and
configuring the new RFID tag for expedited targeting based on its subsequent identification using the portal antenna.

4. The method of claim 2, wherein storing information describing the new RFID tag further comprises:
storing the information in the suppression database; and
copying the information into an additional database stored within a memory of a portal RFID reader for identifying the new RFID tag for potential targeting.

5. The method of claim 4, wherein the suppression database is stored in a suppression RFID reader connected to the suppression antenna.

6. The method of claim 5, wherein copying the information to the additional database comprises transmitting the information from the suppression RFID reader to the portal RFID reader over a network.

7. The method according to claim 1, wherein transmitting the de-targeting command further comprises scheduling the transmitting over time and across operating frequency channels to provide frequency diversity over time.

8. A system comprising:
at least one suppression antenna;
at least one portal antenna; and
one or more RFID readers connectable to the at least one suppression antenna and the at least one portal antenna and configured to:
track, at a first read rate, targeted tags from a population of RFID tags using the at least one portal antenna;
transmit, using the at least one suppression antenna, a de-targeting command to set background tags from the population of RFID tags for tracking at a second read rate, thereby preventing the background tags from being tracked at the first read rate using the portal antenna; and
inventory, using the suppression antenna, the background tags that are set by the de-targeting command, for identification as quieted tags.

9. The system of claim 8, wherein the one or more RFID readers are further configured to:
detect, using a suppression database of the quieted tags, a new RFID tag proximate to the at least one suppression antenna; and
store information describing the new RFID tag, the information configured to provide targeting of the new RFID tag when proximate to the at least one portal antenna.

10. The system of claim 9, wherein the one or more RFID readers are further configured to:
selectively configure at least some of the targeted tags for targeting based on read measurements stored in a targeting database; and
configure the new RFID tag for expedited targeting based on its subsequent identification using the at least one portal antenna.

11. The system of claim 10, wherein the one or more RFID readers are further configured to eliminate records from at least one of the suppression database or the targeting database based on a hold time of from ten seconds to one hour.

12. The system of claim 9, wherein the one or more RFID readers are further configured to:
store the information describing the new RFID tag in a suppression database; and
copy the information into an additional database stored within a memory of a portal reader for identifying the new RFID tag for potential targeting.

13. The system of claim 12, wherein the suppression database is stored in a suppression RFID reader connected to the at least one suppression antenna.

14. The system according to claim 8, wherein the one or more RFID readers are further configured to transmit the de-targeting command over time and across operating frequency channels to provide frequency diversity.

15. An RFID reader comprising:
a processor configured for use in a system for tracking targeted tags from a population of RFID tags at a first read rate and background tags from the population of RFID tags at a second read rate; and
a non-transitory storage medium associated with the processor, the non-transitory storage medium including instructions executable by the processor to cause the processor to:
transmit, using at least one suppression antenna, a de-targeting command to set the background tags for tracking at the second read rate, thereby preventing the background tags from being tracked at the first read rate using a portal antenna;
inventory, using the suppression antenna, the background tags that are set by the de-targeting command, for identification as quieted tags; and
store identities of the quieted tags in a suppression database configured for use in identifying new RFID tags.

16. The RFID reader of claim 15 wherein the instructions, when executed, cause the processor to track targeted tags from the population of RFID tags using the portal antenna.

17. The RFID reader of claim 16, wherein the instructions, when executed, cause the processor to:
selectively configure at least some of the targeted tags for targeting based on read measurements stored in a targeting database; and
configure a new RFID tag for expedited targeting based on its subsequent identification using the portal antenna.

18. The RFID reader of claim 17, wherein the instructions, when executed, cause the processor to eliminate records from at least one of the suppression database or the targeting database based on a hold time of from ten seconds to one hour.

19. The RFID reader of claim 15, wherein the instructions, when executed, cause the processor to:
detect, using the suppression database, a new RFID tag; and
store information describing the new RFID tag, the information configured to provide targeting of the new RFID tag when proximate to the portal antenna.

20. A non-transitory computer-readable medium storing executable instructions, which when executed by a processing device, cause the processing device to perform operations comprising:
tracking, at a first read rate, targeted tags from a population of RFID tags using a portal antenna, the population of RFID tags including the targeted tags and a background tag;
a step for setting, using a suppression antenna, the background tag for tracking at a second read rate in order to prevent the background tag from being erroneously tracked at the first read rate using the portal antenna;
detecting a new RFID tag proximate to the suppression antenna; and
a step for configuring the new RFID tag for expedited targeting based on its subsequent identification using the portal antenna.

21. The non-transitory computer-readable medium of claim 20, wherein the instructions cause the processing device to perform an operation of selectively configuring at least some of the targeted tags for targeting based on read measurements stored in a targeting database.

22. The non-transitory computer-readable medium of claim 20, wherein the instructions cause the processing device to perform operations comprising:
    storing an identity of the background tag in a suppression database; and
    using the suppression database to detect the new RFID tag.

* * * * *